United States Patent [19]

Chen

[11] Patent Number: 5,967,476
[45] Date of Patent: Oct. 19, 1999

[54] WALL HOOK

[76] Inventor: Fang-Yin Chen, No. 310-1, San-Kang Rd., Lung-Chun Tsun, Lung-Chin Hsiang, Taichung County, Taiwan

[21] Appl. No.: 09/178,482

[22] Filed: Oct. 26, 1998

[51] Int. Cl.⁶ .............................. A47G 1/16; A47B 96/06; F16B 45/00
[52] U.S. Cl. .................. 248/222.14; 248/497; 248/304; 248/305
[58] Field of Search .............................. 248/222.14, 497, 248/304, 305

[56] References Cited

U.S. PATENT DOCUMENTS

| | | | |
|---|---|---|---|
| 678,155 | 7/1901 | Bailey | 248/304 |
| 1,086,829 | 2/1914 | MacEvoy | 248/222.14 |
| 1,891,048 | 12/1932 | Keefe | 248/222.14 |
| 1,989,329 | 1/1935 | McDonald | 248/222.14 |
| 3,216,680 | 11/1965 | Musante | 248/497 |
| 3,433,449 | 3/1969 | Musante | 248/497 |

*Primary Examiner*—Leslie A. Braun
*Assistant Examiner*—David Heisey
*Attorney, Agent, or Firm*—Rosenberg, Klein & Bilker

[57] ABSTRACT

A wall hook includes a wall mount having a receptacle portion and a peripheral notch at the receptacle portion, a hook member having a mounting plate at one end fitted into the receptacle portion of the wall mount and fixedly fastened with the wall mount to a flat wall surface by nails and at least one hooked portion extended out of the peripheral notch at the receptacle portion of the wall mount for hanging things, and a shield covered on the receptacle portion of the wall mount to keep the mounting plate and the nails from sight.

1 Claim, 1 Drawing Sheet

WALL HOOK

BACKGROUND OF THE INVENTION

The present invention relates to a wall hook for mounting on a flat wall surface for hanging things, and more particularly to such a wall hook which is detachable and, which causes a sense of beauty when installed.

A variety of wall hooks have been disclosed for mounting on a flat wall surface for hanging things. Among these wall hooks, there is a simple one having a mounting hole at one end for fastening to a flat wall surface by a nail and a hooked portion at one end for hanging things. This structure of wall hook destroys the sense of beauty of the wall because the installed nail is not kept from sight. There are known wall hooks hat keep installed nail or anchoring means from sight when installed. However, these wall hooks are commonly complicated, and their hook members are not replaceable.

SUMMARY OF THE INVENTION

According to the present invention, the wall hook comprises a wall mount having a receptacle portion, a hook member suspended from the wall mount, the hook member having a mounting plate at one end fitted into the receptacle portion and fastened with the wall mount to the wall by nails, and a shield covered on the receptacle portion of the wall mount to keep the nails from sight. The shield has a coupling portion plugged into the receptacle portion of the wall mount. Because the hook member is fastened to the wall mount and the wall by nails, it is replaceable. Because the mounting plate of the hook member and the installed nails are kept from sight, the whole assembly of the wall hook causes a sense of beauty.

DETAILED DESCRIPTION OF THE PREFERRED EMBODIMENT

Figure 1:
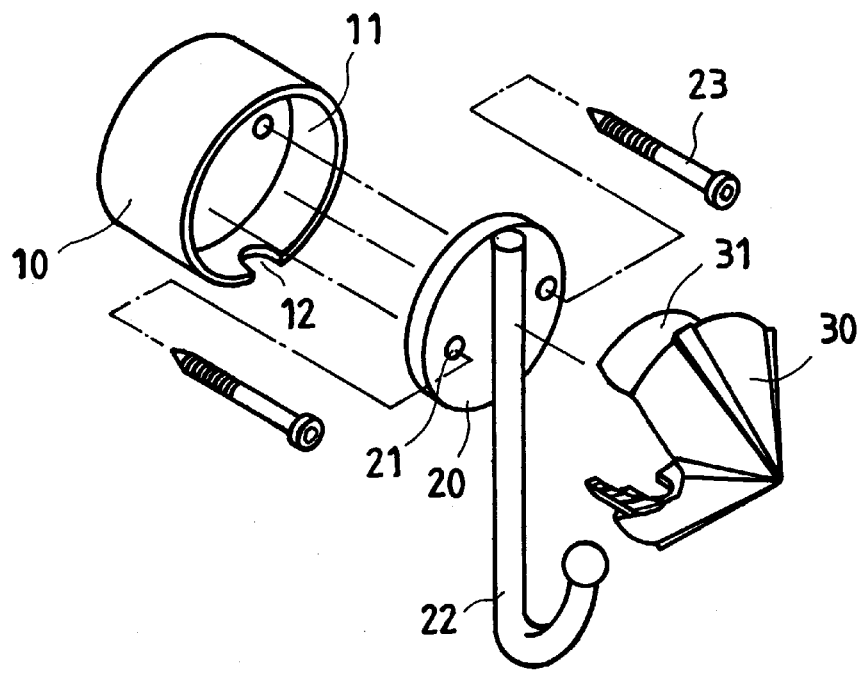
FIG. 1 is an exploded view of a wall hook according to the present invention.

Referring to FIG. 1, a wall hook in accordance with the present invention is generally comprised of a wall mount 10, a hook member 22, and a shield 30.

The wall mount 10 comprises a receptacle portion 11, and a peripheral notch 12 at the receptacle portion 11. The hook member 22 has one end terminating in a mounting plate 20. The mounting plate 20 fits the receptacle portion 11 of the wall mount 10, having a plurality of mounting holes 21. The shield 30 comprises a coupling portion 31 fitting the receptacle portion 11 of the wall mount 10.

Figures 2, 3:
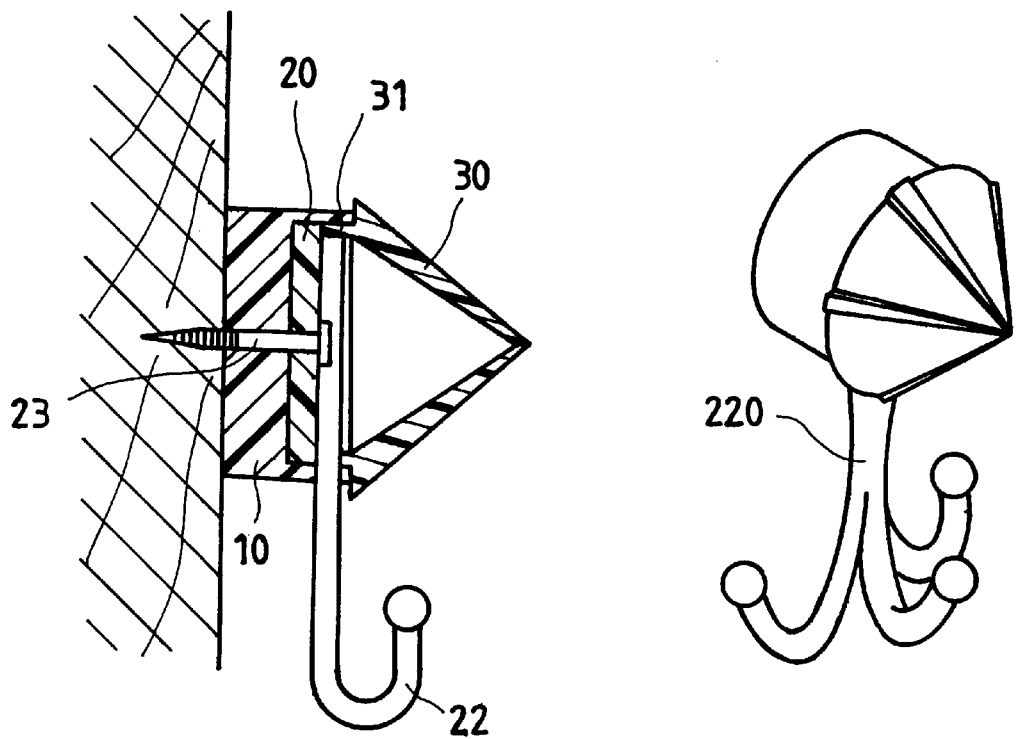
FIG. 2 is a sectional view showing the wall hook installed.
FIG. 3 is a perspective view of an alternate form of the present invention.

Referring to FIG. 2, the mounting plate 20 is inserted into the receptacle portion 11 of the wall mount 10, enabling the hook member 22 to be extended out of the wall mount 10 through the peripheral notch 12, then the mounting plate 20 and the wall mount 10 are fixedly fastened to the wall by nails 23, and then the shield 30 is covered on the wall mount 10 by plugging the coupling portion 31 of the shield 30 into the receptacle portion 11 of the wall mount 10. Because the mounting plate 20 directly receives the weight of the object(s) hung on the hook member 22 and is supported in the receptacle portion 11 of the wall mount 10, a hook member 22 does not wear quickly. Because the shield 30 keeps the nails 23 from sight, the whole assembly of the wall hook has a nice outer appearance when installed.

FIG. 3 shows an alternate form of the wall hook. According to this alternate form, the hook member 220 has a multiple hooked portions for hanging things.

It is to be understood that the drawings are designed for purposes of illustration only, and are not intended as a definition of the limits and scope of the invention disclosed.

What the invention claimed is:

1. A wall hook comprising:

a wall mount adapted to be mounted on a flat wall surface, said wall mount comprising a receptacle portion and a peripheral notch at said receptacle portion;

a hook member inserted through the peripheral notch at the receptacle portion of said wall mount, said hook member having at least one hooked portion at one end respectively disposed outside said wall mount for hanging things and a mounting plate at an opposite end fitted into said receptacle portion adapted to be and fixedly fastened with said wall mount to the flat wall surface by nails simultaneously extending through said wall mount and said mounting plate; and shield means covered on said receptacle portion of said wall mount to keep said mounting plate and said nails from sight, said shield means having a coupling portion plugged into said receptacle portion of said wall mount.

\* \* \* \* \*